(12) United States Patent
Smitt et al.

(10) Patent No.: US 7,750,906 B2
(45) Date of Patent: Jul. 6, 2010

(54) SYSTEMS AND METHODS FOR LIGHT PRUNING

(75) Inventors: Erik Smitt, El Cerrito, CA (US);
Maxwell Planck, Emeryville, CA (US)

(73) Assignee: Pixar, Emeryville, CA (US)

( * ) Notice: Subject to any disclaimer, the term of this patent is extended or adjusted under 35 U.S.C. 154(b) by 1094 days.

(21) Appl. No.: 11/407,466

(22) Filed: Apr. 19, 2006

(65) Prior Publication Data
US 2007/0247460 A1      Oct. 25, 2007

(51) Int. Cl.
*G06T 15/00* (2006.01)
(52) U.S. Cl. .................. 345/426; 345/158; 345/624
(58) Field of Classification Search .............. 345/426, 345/158, 624
See application file for complete search history.

(56) References Cited
U.S. PATENT DOCUMENTS

| | | | |
|---|---|---|---|
| 6,400,373 B1 * | 6/2002 | Uchiyama et al. ........... 345/629 |
| 7,499,027 B2 * | 3/2009 | Brigham et al. ............. 345/158 |
| 7,508,390 B1 * | 3/2009 | Demers ....................... 345/426 |

* cited by examiner

*Primary Examiner*—Phu Nguyen
(74) *Attorney, Agent, or Firm*—Townsend and Townsend and Crew LLP; Gerald T. Gray (57) ABSTRACT

The effective illumination volume (e.g., angular spread and falloff) of each light source in an object model scene can be represented by a simple geometry. Geometry-based culling techniques then can be used to automatically remove or de-activate lights for a frame, set of frames, or entire shot of animation, based on interactions of the light geometries with objects in the scene. The light pruning process can be run in a pre-pass procedure, such that production and rendering preparation procedures do not have to deal with lights that will not affect a final image. Further, a pre-pass pruning removes lights before rendering, such that the data for each light does not have to be loaded into memory at render time. Removing the lights before rendering also can reduce a amount of ray tracing and other processing used for the lights at render time.

25 Claims, 6 Drawing Sheets

SYSTEMS AND METHODS FOR LIGHT PRUNING

BACKGROUND OF THE INVENTION

This invention relates to the field of computer graphics, and, more specifically, to optimizing the processing of light sources used in generating computer graphics images and animation.

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Surface attribute functions can define the values of attributes of surfaces in three-dimensional space. Surface attribute functions can be evaluated at any point on the surface to provide corresponding attribute values at that point on the surface. Attributes of surfaces can include optical properties of a surface, such as color, transparency, reflectivity, and refractivity. Attributes can also include visibility or occlusion information; artistically or procedurally generated texture data in one, two, three, or more dimensions; shadow generation information; illumination information, which specifies the amount and direction of light on the surface point from other portions of the scene; and rendering information, such as ray tracing path information or radiosity rendering information. Functions can be relatively simple, such as looking up texture data from a texture map, or very complex, such as the evaluation of complex user-defined shader programs, ray tracing programs, animation or modeling programs, or simulation programs.

An application such as a rendering or animation application determines pixel values in an image by evaluating or sampling a surface and its associated surface attribute functions. Surfaces can include triangles and polygons; higher-order surfaces such as B-splines; subdivision surfaces; and implicit surfaces, among others.

As part of the determination of a color attribute of a point (or points) on a surface, each light source in a set typically is evaluated to determine whether that light source contributes to the computed color value of that point. This determination entails identifying whether the light emitted from each light source is transmitted to the given point on the surface, whether the light is blocked by some other element of the object scene, and/or whether the light falls off (loses all intensity or ability to light an object) before reaching the surface. It further is possible that the light source is outside the frame or shot (multiple contiguous frames) of animation, or outside the view of a virtual camera viewing the set and determining the bounds of the frame(s), but still illuminates at least one surface in the frame or shot. Even further still, a light outside a frame might cast a shadow on an object or surface in the frame.

The process of rendering an image or frame of animation then can be a very time-consuming process, particularly where the set of object models for a scene includes hundreds or even thousands of lights. For example, a scene taking place in a sports stadium might have a thousand individual field lights scattered around the top of the stadium. There also can be hundreds or thousands of additional light sources, such as light sources representing flash bulbs of cameras in the stands, spotlights, or any other type of modeled light source or other source of illumination, such as the reflective surface of an object. When rendering a shot for such a set, the renderer typically must analyze each individual light source in the entire set to see how that source affects the objects or surfaces in the shot, even when the frame of the virtual camera for the shot only contains or pans over only a portion of the set. The analysis for each of the thousands of light sources can be very time consuming and data intensive.

In one example, analyzing the light sources at render time involves loading data for each light into memory. Since there is no way to know ahead of time if a light will affect a given frame or shot, it is necessary to do a determination for each individual light source for that set. This can involve, for example, doing ray tracing from each light source to determine if any objects are affected by the light source. For a camera flash, for example, it might be determined that the camera affects everything in front of the camera within about 50 feet (approximately based on image scale) of the flash. It then is necessary to do a ray tracing from the source of the flash, determine any interactions, and determine whether the interaction(s) are within the effective (or fallout) range of that light. These determinations need to be done not only for direct illumination, but other lighting such as reflections or casting of shadows. As rendering time is very costly, these additional lighting calculations can be very expensive.

It therefore is desirable to develop a methodology for quickly and automatically pruning lights in a given frame, group of frames, and/or shot of animation, thereby reducing rendering time without significantly increasing the time for lighting, preparation, or other processes.

BRIEF SUMMARY OF THE INVENTION

Systems and methods in accordance with various embodiments of the present invention can overcome these and other deficiencies in prior art lighting approaches by providing for the automatic pruning of light sources that do not interact with objects in scene.

In one embodiment, light sources can automatically be pruned from a scene of animation by first generating a geometric representation for each light source in the scene, such as for a frame or shot of animation. The geometric representation can take any appropriate form, such as a convex hull or set of points. A determination can be made as to whether each geometric representation intersects with any object model in the scene. The frame (or frames) itself can be set up as an object model, such that a determination can be made as to whether the geometric representation intersects with the frame and could affect any object later added to the frame. For each geometric representation that does not intersect with at least one object model, the respective light source can be removed from that frame or shot. In one embodiment, a light source is removed by setting an attribute for that light source in a light point file that designates the light as being deactivated for that particular frame or shot. This pruning can be done before processing and/or rendering of the frame or shot.

In another embodiment, light sources can automatically be pruned from a shot of animation by generating a geometric representation for each of a plurality of light sources. A determination can be made whether each of these geometric representations intersects with any object model viewed by a virtual camera during that shot of animation. The virtual camera can make any appropriate movement during the shot, such as a pan or zoom. Each light source that does not intersect with at least one object model viewed by the camera during the shot can be removed from the shot. As discussed above, this can involve any appropriate removal mechanism, such as setting an attribute for that light source in a light point file that designates the light as being de-activated for that particular shot.

Other embodiments will be obvious to one of ordinary skill in the art in light of the description and figures contained herein.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments of the present invention can quickly and automatically remove or deactivate light sources from a frame or shot of animation before the rendering process. Deactivation, for example, can occur during a pre-pass process on the frame(s) to be rendered utilizing existing technology, such as geometry-based culling procedures. De-activating the lights in a pre-pass process not only can save expensive rendering time by reducing the amount of information to be processed in rendering, but also can save time in other pre-rendering steps such as lighting and texture mapping, as fewer objects in a scene have to be considered.

Figure 1:
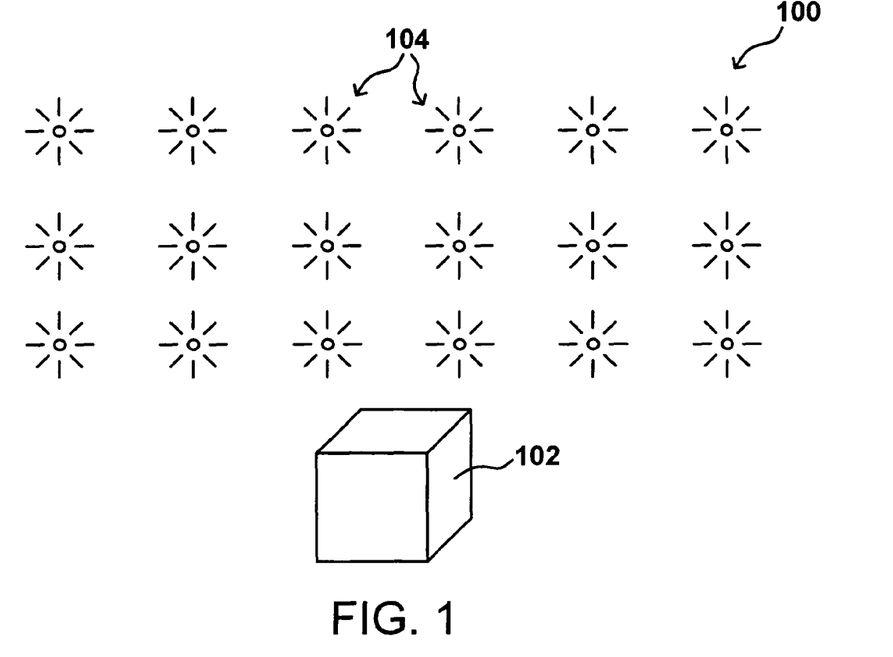
FIG. 1 illustrates a number of light sources that can possibly affect an object within a set in accordance with one embodiment of the present invention.

In one example, FIG. 1 shows a set 100 including various object models to be used for a shot of animation. The set 100 is seen to include a cube 102 and a plurality of light sources 104 useful for lighting the cube. Although the light sources appear to be in a two-dimensional array, it should be understood that the lights are not constrained to lie in a plane and can, in fact, be at varying distances from the cube 102 outside the plane of the image.

Figure 2:
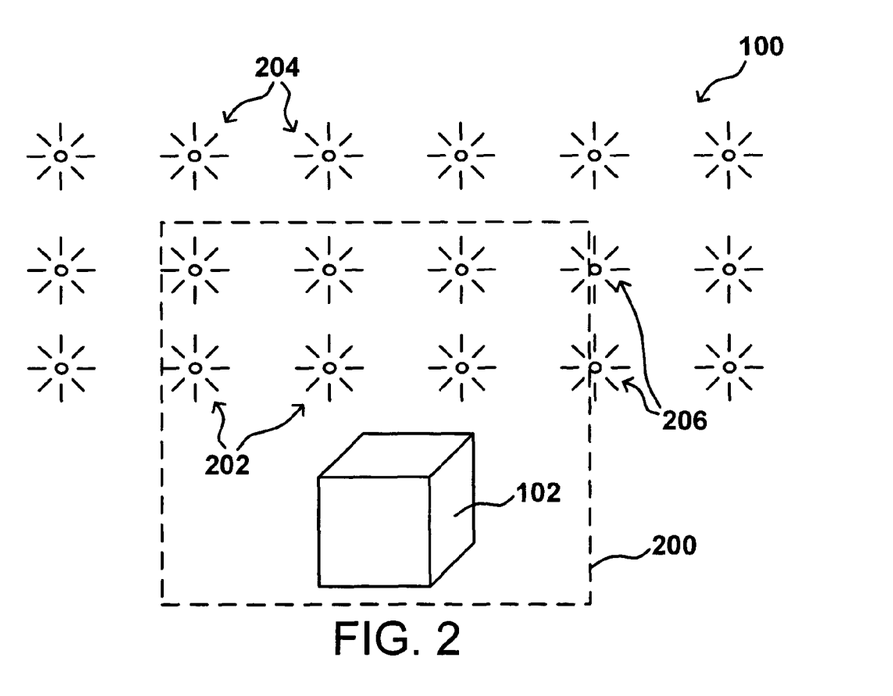
FIG. 2 illustrates a portion of the set of FIG. 1 that is visible in a single frame of animation in accordance with one embodiment of the present invention.

When generating one or more computer graphics images, such as frames of animation, a virtual camera is considered to be viewing the set 100. The three-dimensional region of the scene in field of the view of the virtual camera is often referred to as a view frustum. Based on the "location" or "point of view" of the virtual camera relative to the object scene, a portion of the set will be considered to be in the view of the camera, defining the contents and position of a view frustum 200 of animation relative to the object set 100, as shown in FIG. 2. Some of the lights 202 in this example are contained within the view frustum 200, while some lights 204 are outside the view frustum. Some lights 206 are contained just outside the view frustum, but may still affect the cube 102 within the view frustum 200. It is possible than any of these lights illuminate or shadow any character or other object in the view frustum, regardless of whether the light itself is within the view frustum.

In some types of renderers, ray tracing is used to sample the object set for the various pixel regions of the final image. In ray tracing, rays are projected from the location of the virtual camera, through pixels in an image plane, to intersect surfaces of the cube 102 or other objects at the appropriate location (defined by the position of the camera and the pixel being analyzed). Secondary rays are further recursively cast from their intersection points of surfaces towards one or more light source to determine the effect of the lights on surfaces. If the secondary rays are blocked from reaching a light source by an intervening surface, the surface is in shadow with respect to that light source. Otherwise, the surface is lit by the light source. Illumination values can be determined for all surface intersection points based on the paths of its associated rays. Secondary rays can also be cast to account for reflection, refraction, transparency, and other optical effects.

In other types of renderers, such as scanline and rasterization renderers, lights are specifically assigned to objects or surfaces. The light provides illumination values to all of the surfaces that it is assigned to. Shadows, reflections, refractions, transparency, and other optical effects can be handled with shadow maps or shadow volumes, environment maps, alpha blending, and other techniques known in the art.

Typical renderers, including ray tracing renderers, scanline renderers, and rasterization renderers, use the illumination values determined for surface sample points, along with surface attribute values, and optionally shader programs to determine the color and other attributes of surface sample points. Multiple samples of surfaces may be taken for each pixel and combined according to a filter function to obtain image data for the pixel. In this case, some samples may lie within a shadow for one light source while other samples within the same pixel region are lit by another light source.

In various animation approaches, these light sources start out as being able to affect anything in an object set. A particular type of light source then can have various constraints or attributes set that determine the illumination pattern for that type of source. As lights of different intensity can have different effective distances, a cutoff value can be set or determined for each light type (or individual light sources where preferred). A cutoff value can define a maximum distance between the light source and an object where the light source can still illuminate, or cast shadows on, the object. In another aspect, an animator can apply a set of virtual "barn doors" to the light source. As known in the film industry, barn doors refer to the panels on the sides (and top and bottom) of a set lighting source than can be opened or closed by different amounts to control the effective angle of illumination for a light. For example, a spot light might start out being able to affect a full 180 degree angle with respect to the direction that the light source is pointed. The barn doors can be adjusted to limit the light source to an effective 30 degree angle in the horizontal and vertical directions. It should be understood that the horizontal and/or vertical directions can have different angular spreads, and that any other appropriate direction other than horizontal or vertical can be used as desired.

Figure 3:
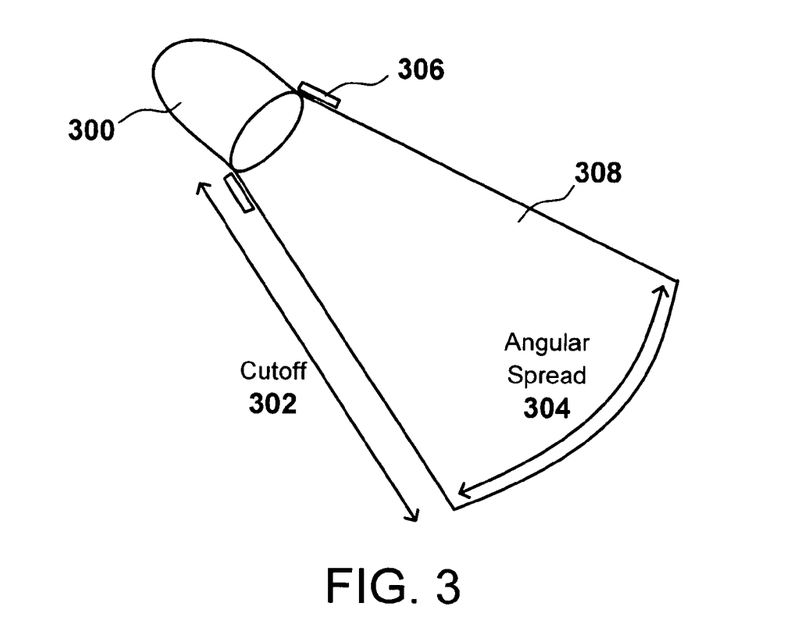
FIG. 3 illustrates a shape that can be used to approximate the effective area of a light source in accordance with one embodiment of the present invention.

FIG. 3 shows one example of such a light source 300 (illustrated as an actual light object model, although the source could actually just be a point source or any other source of illumination). As shown, the light source has an associated cutoff length 302, which determines the effective illumination distance of the light source 300. Also, the light source 300 has a set of barn doors 306 used to determine an effective angular spread 304 of illumination for the light 300. As can be seen, these parameters define a frustum of illumination, where the ends of the frustum are set by the light source and the effective cutoff length of the light. Taking advantage of these parameters, a computationally efficient convex hull 308 approximates the effective illumination region for the light source 300. This convex hull 308 can be used to represent the illumination from the light source 300 as a geometry, which then can be used with existing geometry culling techniques to quickly remove various lights from a frame as will be discussed in further detail below. Such a process can be much faster than ray tracing, and can be done before rendering.

Figure 4:
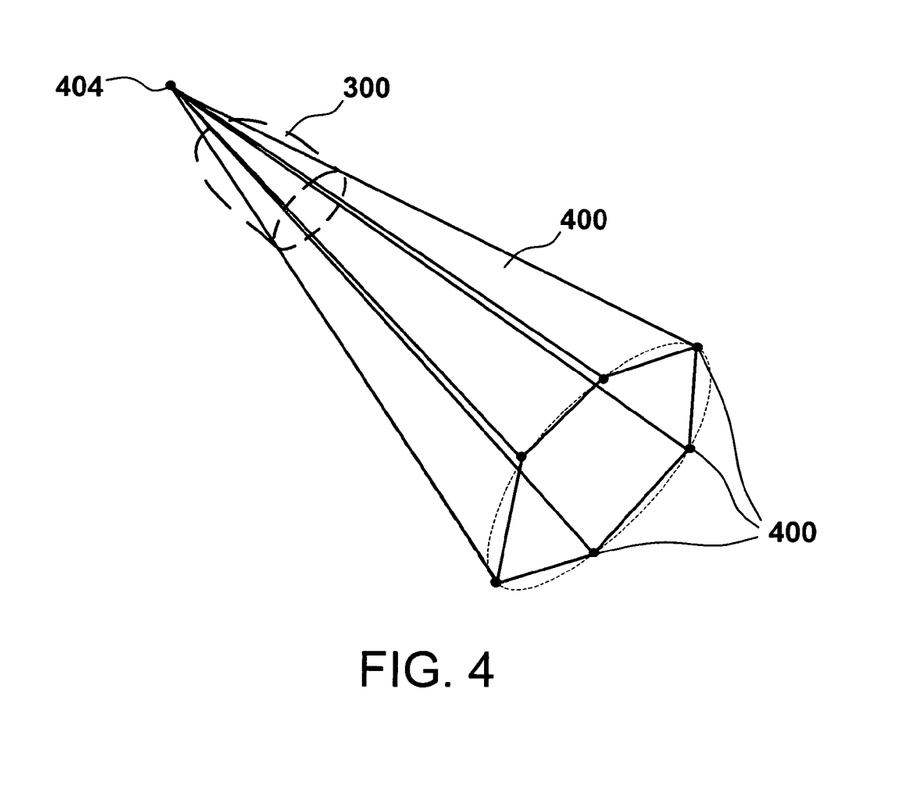
FIG. 4 illustrates a geometric construct that can be used to approximate the effective area of a light source in accordance with one embodiment of the present invention.

In order to further simplify the lighting determinations in accordance with one embodiment, each convex hull can be represented by a set of points. For example, as shown in FIG. 4, a set of points 402 can be selected about the edge of the convex hull away from the light source 300. The points will form a polygon (such as a hexagon, octagon, etc.) positioned at the cutoff distance from the light source 300. The light source (based on the angular spread and width, for example) can further be approximated as a point source 404. The point source 404 and the cutoff points 402 then form a simple geometric shape 400 defined by those points. This simple geometry can be used to cull light sources from a frame of animation using existing geometry-based culling techniques as known in the art. A potential disadvantage to a point approximation, however, is that an intersection with another object might be missed where a circular cone is approximated by a hexagonal pyramid, for example, as the area occupied by the hexagonal pyramid will be a subset of the area occupied by the circular cone, such that the hexagonal pyramid can intersect with fewer points. An increase in the number of points used for the geometric representation can reduce this disadvantage, as the polygon will approach the circular shape. Further, the advantage in speed may far outweigh the slight disadvantage relative to objects that are only slightly illuminated by a light source. In another embodiment a tangent at each point is used to construct the geometric representation, so that the convex hull or other geometric approximation encloses the entire effective illumination region. This embodiment may be over inclusive of lights that do not actually affect objects in the view frustum, thereby slightly increasing processing time to ensure that lights are not inadvertently culled.

Figure 5:
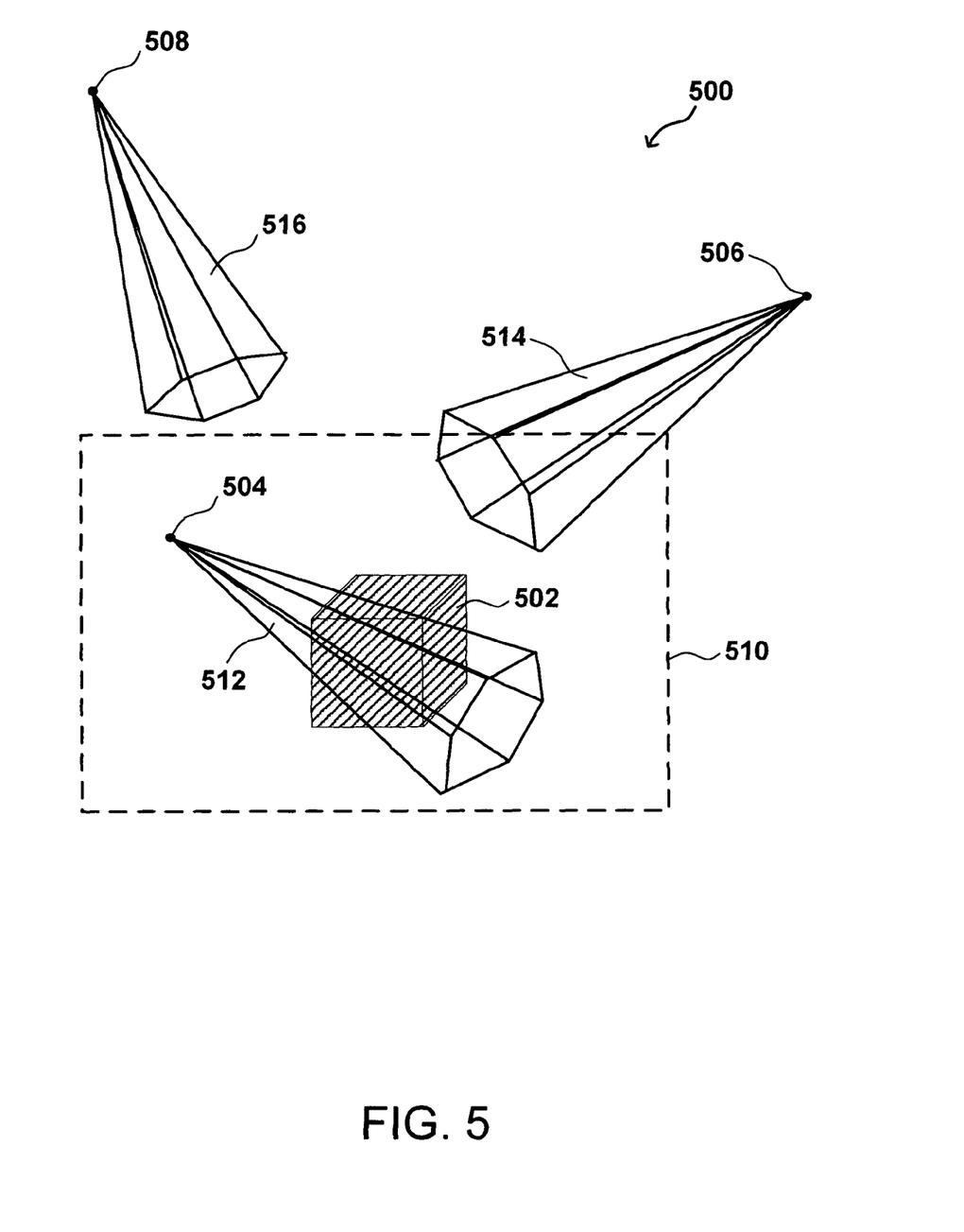
FIG. 5 illustrates the relationship of various lighting geometric constructs with an object in a frame of animation approximate the effective area of a light source in accordance with one embodiment of the present invention.

In one example, FIG. 5 shows at set 500 including an object model for a cube 502 and three light sources 504, 506, 508. A view frustum 510 representing the camera position and field of view for at least one frame of animation using the set is also shown. In a pre-pass process, a simple illumination geometry can be generated for each light source as discussed above. This pre-pass process can take the form a script executed against the object models for the set, as known in the art, using a scripting language such as Perl. By comparing the geometries associated with the light source and objects in the view frustum, it can easily be determined that the geometry 516 for light source 508 does not intersect the view frustum 510 or any objects within it. Thus, light source 508 can be removed or "de-activated" for all frames using this camera position and field of view. In one embodiment, this involves de-activating the light source by setting an "active" attribute of the light to "active=0" in the appropriate lighting file, whereby the light is not further processed or rendered for this frame of animation. Various other alternatives can be used to select or deselect lights for a scene as would be obvious to one of ordinary skill in the art, such as by generating a list of selected lights or otherwise selecting the active lights or de-selecting the non-active lights.

The geometry 512 generated for light source 504 is shown to intersect object 502 in the view frustum 510. This intersection of the geometry 512 with the geometry associated with an object model can be used to select or activate the light source 504 using existing geometry culling techniques. The geometry for each light can be analyzed, and the appropriate attribute for the light can be set to "active=1" if there is an intersection. If there is no intersection, the light attribute can be set to "active=0," and the light is not considered for any subsequent processing or rendering. The techniques for determining intersections between different geometric shapes, such as convex hulls, polygons, surfaces, and frustums, such as generic polygon clipping algorithms, are well known in the art and, as such, will not be discussed in detail herein.

A choice then can be made for sources such as light source 506. As can be seen, the geometry 514 associated with light 506 intersects the view frustum 510 of animation, but does not intersect any object 502 within the view frustum. In one embodiment, the lack of intersection between geometry 514 with an object 502 can cause light source 506 to be deactivated. Another embodiment leaves light source 506 active since a portion of the effective illumination region lies in the view frustum 510. By leaving the light 506 active, objects can be added or moved within the view frustum without requiring the light selection process to be run again. In order to allow such lights to remain active, a geometry can be generated that is associated with the view frustum 510, or camera view, such that the intersection of the light with the view frustum geometry can cause the light to be activated. The selection of the geometry for the camera view may not be simple, however. For shots off into the horizon, the distance that the camera can see in the shot is theoretically infinity (although there will practically be some maximum distance at which objects can be resolved). Various ways for handling this, such as by only activating lights off screen for a given distance from the virtual camera or manually lighting objects far off in the distance, will be obvious to one of ordinary skill in the art in light of the teachings and suggestions contained herein. The choice of whether to use the view frustum as an intersectable object can be made by an animator through an animation tool or process, for example, capable of receiving and/or executing the selection.

Figure 6:
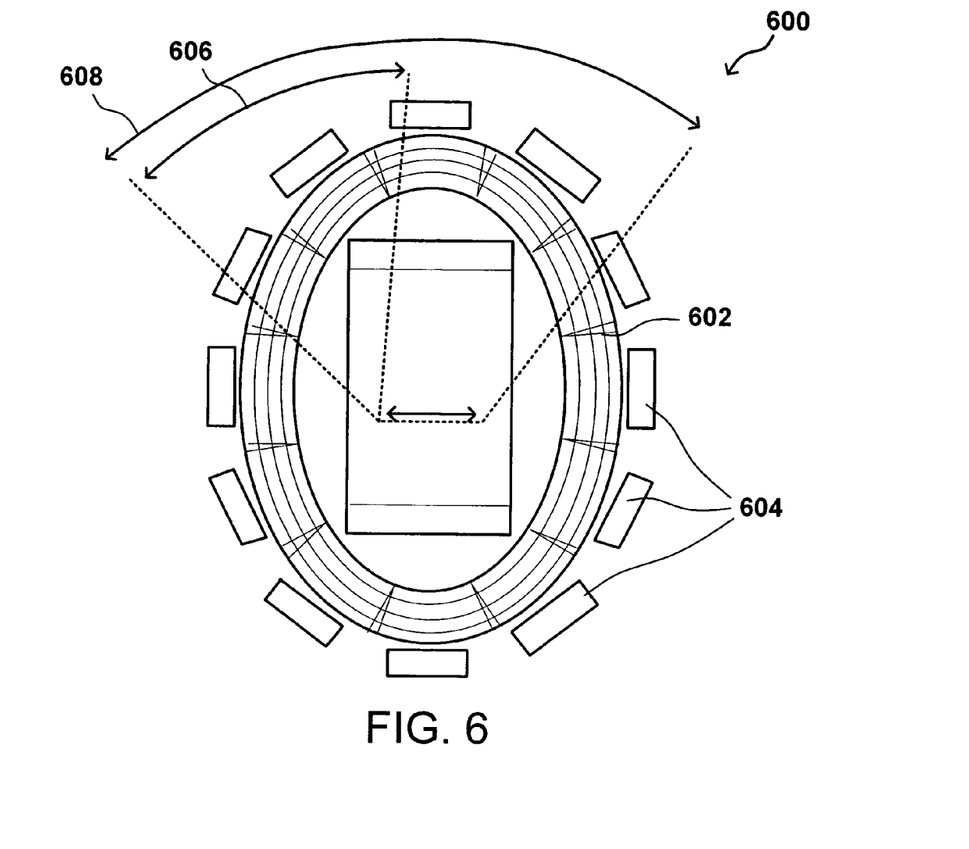
FIG. 6 illustrates the portion(s) of a stadium viewed in a frame and a shot of animation approximate the effective area of a light source in accordance with one embodiment of the present invention.

Using such a technique can drastically reduce the complexity of a scene containing potentially thousands of lights as discussed above. For example, FIG. 6 illustrates an overhead view of a set for a sporting stadium 600. As can be seen, the stadium has a seating area 602 wherein attendees of an event can flash camera bulbs or otherwise act as potential light sources for a frame of animation. The stadium also has several sets of field lights 604, each of which can contain tens or hundreds of individual light sources. In order to ensure that a scene in the stadium is properly lit, it can be desirable to include each light source that affects even a portion of a shot.

FIG. 6 shows the visible or "in-camera" area for a camera translation and sweep 608 for a given shot or scene in the stadium 600. The shot will be composed of a series of individual frames, such as is represented by the viewable camera angle 606 for one of those frames. As can be seen, many of the field lights 604 are not contained in the shot, and many of those further may not affect the illumination of objects within the overall shot. Many of these field lights then can be removed by representing the lights as geometry and running a geometry culling technique as discussed above.

For a camera sweep for a scene, an embodiment of the invention can determine bounding sides of the camera frustum during the sweep, including any zooms or pans. For example, a combined view frustum representing the field of view during a camera sweep can be determined from the union of view frustums at all of or a representative sample of camera positions. This combined view frustum representing the camera sweep can be used to deactivate lights for the shot. Because this sweep can cover a large area, pruning again at a per frame level can save time at rendering as discussed below. A light point file can be generated containing all active lights for the camera sweep, and a subsequent light point file can be generated for each frame or set of frames as desired.

When running a geometry culling operation to de-activate lights as described above, a choice can be made as to whether to cull the lights for each individual frame 606, for a set of frames (as rendering often is done for a group of about 3-5 frames), or for an entire shot 608. For example, where rendering is done for a group of three frames, it might be more efficient to simply run one light culling operation for the set of three frames, since the lighting may not drastically change between those frames, and it might take longer to actually render each frame separately using a separate active lighting set. Further, where speed, memory, and other factors allow, it might be acceptable to simply remove or de-activate lights that do not affect any part of an entire shot 608, instead of doing frame-by-frame removal, as there still can be a dramatic increase in rendering savings while there is a minimal amount of pre-pass processing to be done. Any other appropriate approach to de-activating lights can be used as would be understood to one of ordinary skill in the art.

Figure 7:
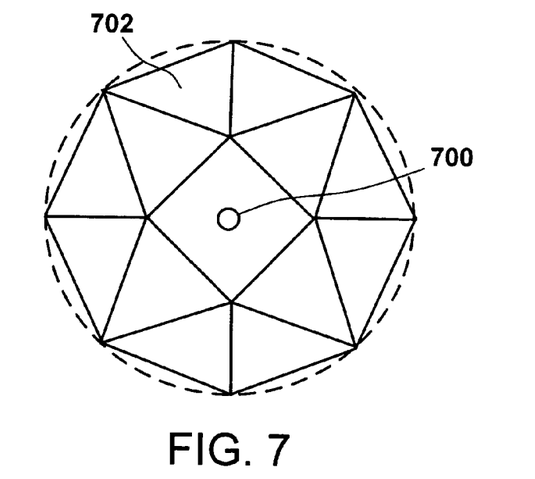
FIG. 7 illustrates another geometric construct that can be used to approximate the effective area of a light source in accordance with one embodiment of the present invention.

It also should be understood that a number of other geometries can be generated for light sources in the set, as would be understood to one of ordinary skill in the art. For example, a point source of light allowed to radiate in any direction could be approximated by a set of points positioned about a sphere having a radius defined by the cutoff value of the point source 700, as shown in FIG. 7. The points can form a geometry 702 than can be used for geometry-based culling as described above. Other sources of light can have other appropriate geometries, such as a cylinder approximating a focused light such as a laser beam. Still others are possible, such as where light is reflecting off an object onto another object, or where an occluder is at least partially occluding the light and casting a shadow.

Figure 8:
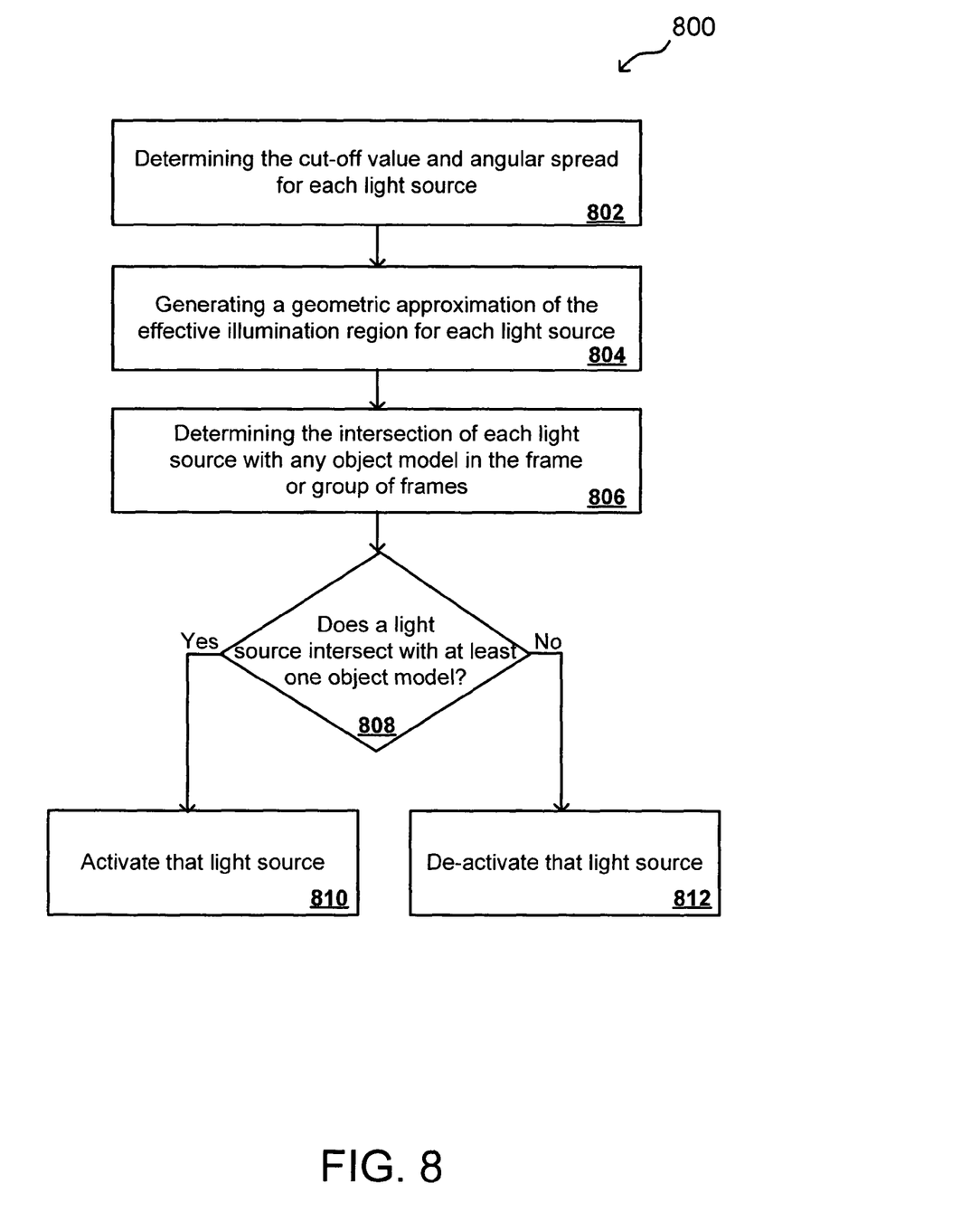
FIG. 8 illustrates steps of a light selection method in accordance with one embodiment of the present invention.

FIG. 8 illustrates steps of a process 800 for automatic light pruning in accordance with one embodiment of the present invention. In the process, the cutoff value and angular spread of each light source in an object set is determined 802. Using the position and type of the light source, along with the cutoff value and angular spread, a geometric representation of the effective illumination region for each light source is generated 804. As discussed above, this geometry can take the form of a convex hull or series of points, for example. The intersection of each geometric lighting approximation with any object in a frame or shot of animation, including possibly a geometric representation of the view frustum, then can be determined 806. If a geometric lighting approximation intersects with at least one object in the frame or shot 808, then the respective light source is activated 810. If the geometric lighting approximation does not intersect with at least one object in the frame or shot, then the respective light source is de-activated 812. The list or group of activated light sources then is passed along for further processing and rendering.

The lights that are passed along for processing and rendering still may undergo ray tracing and other subsequent processing in a renderer, shader, or other device or application. An advantage to the pre-pass processing and removal of lights from a shot, for example, is that the culled lights never have to be loaded into memory and processed, just to determine that they are not needed. There is no need to do complex ray tracing calculations for lighting that is never going to be seen in the final image. The preparation time for a frame containing many lights could take several hours, such as to prepare the ray tracing and other calculations, even before going through rendering.

Advantages to geometry-based light pruning in a pre-pass process then can be two-fold. A first advantage can be obtained in production. A shot lighter configures the lighting parameters of a scene to achieve a desired visual and aesthetic impact. When a shot lighter begins working on lighting a shot on a complex set containing thousands of lights, he or she may be overwhelmed by the number of lights, and it can be a very involved process to get that many lights to illuminate each object in a scene in a desirable and aesthetically pleasing way. In previous systems, a shot lighter might have to first go into a shot and figure out which lights likely do not affect any objects in the scene, then manually deactivate those lights.

However, in many cases, the camera parameters for the shot are already determined by this point, thus making some lights unnecessary for the shot. By automatically pruning out the unnecessary lights in advance, the shot lighter only has to cope with a smaller number of lights actually affecting the appearance of objects in the frame.

The light pruning can use different pre-pass processes for production and for rendering. For example, a shot lighter may want access to all lights for a given shot (series of frames), knowing that not every light will affect every individual frame in that shot. The shot lighter then can light the entire shot, without having to go frame by frame. A more aggressively pruned set of lights might be desirable to use at render time, where only a small number of frames may be rendered and it is not necessary to render every light for the entire shot. This can provide a second advantage at render submission time, wherein only lights necessary for a five frame group of the shot, for example, are loaded for rendering. In one embodiment, a second pre-pass procedure is included in the scripts run between rendering submission and rendering, in order to ensure that any light not needed for the frames being rendered is pruned before rendering. This can provide a significant increase in render speed. For example, a shot on a set might involve two thousand lights, but each individual frame might only require on the order of tens or hundred lights.

Any light point files generated during a pre-pass process also can be used in other ways to assist in production. In one example, a light point file can be used to color a set model based on whether a light is active in a frame or shot. For example, an animator can view a model of the set wherein each activated light is colored in a first color, such as green, and each de-activated light is colored in a second color, such as red. This can allow an animator to easily see which lights are active in any given scene. A scene lighter can use such a tool to manually activate lights that were previously de-activated, and then adjust the properties of those lights in order to affect the illumination of objects in a shot. In one embodiment, an animation tool can step through each frame of animation and show an updated color representation of each light, allowing for an easy determination of how different lights are being activated and de-activated per frame. The animator can pan the model independent of the camera frustum in order to better view the deactivated lights.

In another embodiment, pre-pass information contained in light point files, for example, can be inherited by subsequent shots. For example, a primary camera viewing a portion of a race track might use the same camera frustum for several frames of animation as objects circle around the track. In such a situation, the script can first look to see if an existing light point file exists for this camera frustum (or, where processing for a group of frames, if a light point file exists for any of the frames) for each frame being pre-processed. If a file exists, that file can be used to activate and/or deactivate the appropriate lights. This can help to reduce processing time while still providing accurate results. In situations where a portion of the lights (e.g., spotlights) might remain the same but other lights (e.g., camera flashes) might differ, a portion of the previous light point file can be used as appropriate. Each light then can have an attribute set, such as "constant=0" signifying that the light does not change during a shot.

Figure 9:
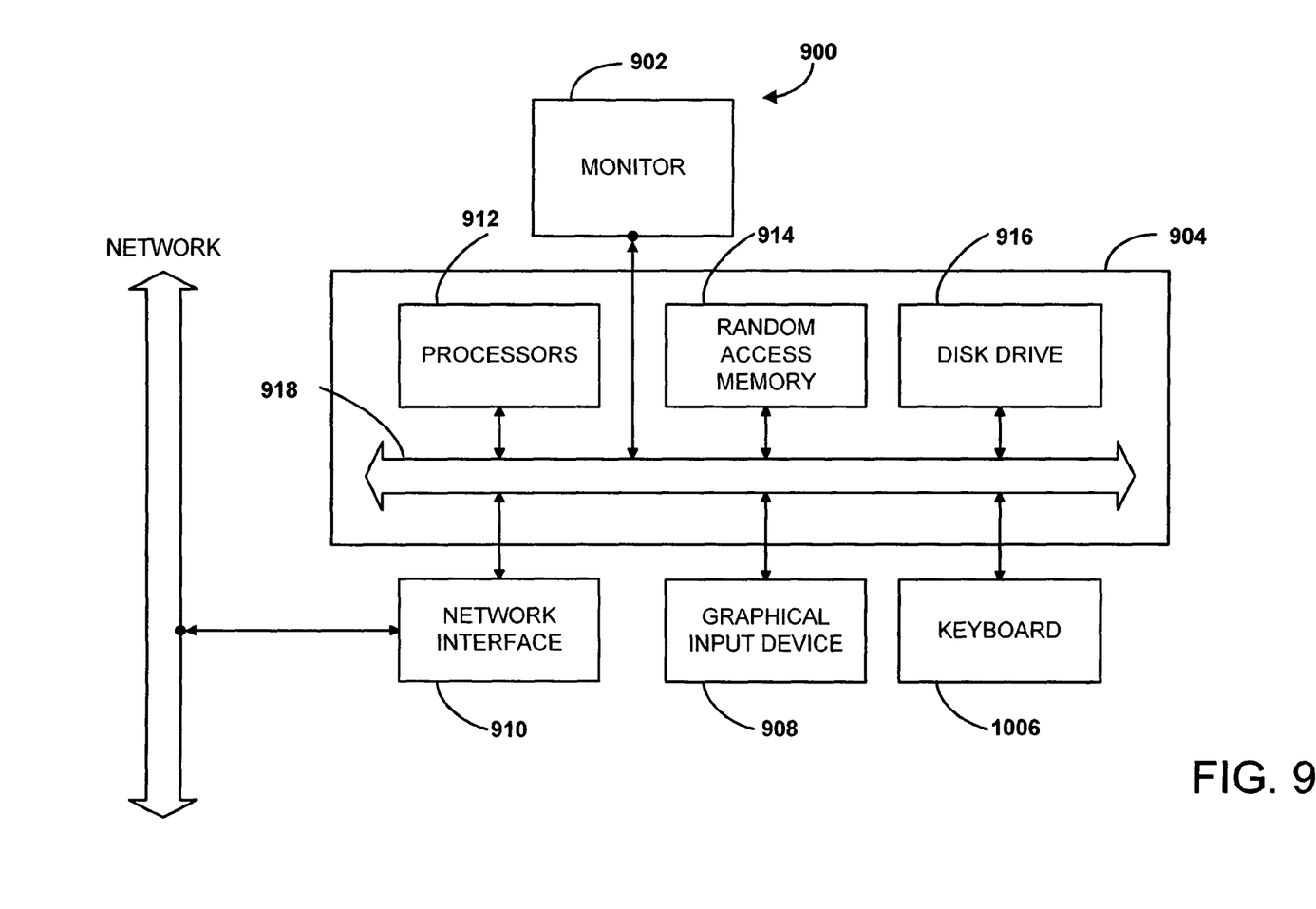
FIG. 9 illustrates a processing system that can be used in accordance with various embodiments of the present invention.

FIG. 9 illustrates an example computer system 900 suitable for implementing an embodiment of the invention. Computer system 900 typically includes a monitor 902, computer 904, a keyboard 906, a user input device 908, and a network interface 910. User input device 908 includes a computer mouse, a trackball, a track pad, graphics tablet, touch screen, and/or other wired or wireless input devices that allow a user to create or select graphics, objects, icons, and/or text appearing on the monitor 902. Embodiments of network interface 910 typically provides wired or wireless communication with an electronic communications network, such as a local area network, a wide area network, for example the Internet, and/or virtual networks, for example a virtual private network (VPN).

Computer 904 typically includes components such as one or more processors 912, and memory storage devices, such as a random access memory (RAM) 914, disk drives 916, and system bus 918 interconnecting the above components. Processors 912 can include one or more general purpose processors and optional special purpose processors for processing video data, audio data, or other types of data. RAM 914 and disk drive 916 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The diagrams and flow charts are shown for ease of understanding. However it should be understood that combinations, additions, re-arrangement, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of automatically pruning light sources from computer graphics data used to define at least one computer graphics image, the method comprising the steps, implemented in a computer device, of:
    receiving computer graphics data defining a scene including at least one light source and at least one object model;
    generating a geometric representation of an effective illumination region for a light source in the scene;
    determining an intersection between the geometric representation and said at least one object model; and
    removing the light source from the scene in response to a determination that the geometric representation of the light source does not intersect with the object model in the scene.

2. The method according to claim 1, wherein:
    generating a geometric representation for the light source includes determining a cutoff value of the light source.

3. The method according to claim 2, further comprising:
    generating a convex hull for the light source based on the cutoff value of the light source.

4. The method according to claim 3, further comprising:
    approximating the convex hull with a set of points.

5. The method according to claim 1, wherein:
    generating a geometric representation for the light source includes determining an angular spread of the light source.

6. The method according to claim 5, further comprising:
    generating a convex hull for the light source based on the angular spread of the light source.

7. The method according to claim 1, wherein:
    the geometric representation approximates the effective illumination region as a set of points.

8. The method according to claim 1, wherein:
    the object model represents the field of view and camera position for at least one frame.

9. The method according to claim 8, further comprising:
    determining a plurality of camera positions and fields of view from the computer graphics data; and
    defining the object model to encompass at least a portion of the scene in the plurality of camera positions and fields of view.

10. The method according to claim 1, wherein:
    the object model represents an object to be rendered in the scene.

11. The method according to claim 1, wherein the object model represents an approximation of a second object model to be rendered in the scene.

12. The method according to claim 1, further comprising:
    executing the steps of this method before submitting the computer graphics data including the scene for rendering.

13. The method according to claim 1, further comprising:
    generating a light point file containing a light source that remains in the scene.

14. The method according to claim 1, wherein:
    removing the light source from the scene includes setting an attribute of the light to a value indicating that the light source is unused.

15. The method according to claim 14, further comprising:
    determining from the attribute value if the light source is used;
    creating a visual representation of the scene, wherein the visual representation includes the light source in response to a determination that the light source is used.

16. The method of pruning light sources from a computer graphics data specifying at least one computer graphics image, comprising the steps, implemented in a computer device, of:
- receiving computer graphics data defining a scene including at least one light source and a plurality of object models;
- generating a geometric representation of an effective illumination region of the light source; and
- removing the light source from the computer graphics images specified by the computer graphics data in response to a determination that the geometric representation does not intersect with at least one of the plurality of object models potentially visible in the computer graphics images specified by the computer graphics data.

17. The method according to claim 16, wherein:
removing comprises removing the light source from the computer graphics data.

18. The method according to claim 16, wherein:
removing comprises setting an attribute of the light source included in the computer graphics data to a value indicating that the light source is unused.

19. The method according to claim 16, wherein:
the geometric representation approximates the effective illumination region as a set of points.

20. The method according to claim 16, wherein the object model represents the field of view and camera position for at least one frame.

21. The method according to claim 20, further comprising:
- determining a plurality of camera positions and fields of view from the computer graphics data; and
- defining the object model to encompass at least a portion of the scene in the plurality of camera positions and fields of view.

22. The method according to claim 16, wherein:
the object model represents an object to be rendered in the scene.

23. The method according to claim 16, wherein:
the object model represents an approximation of a second object model to be rendered in the scene.

24. A computer-readable storage medium that stores code for execution in a processor of a computer device, the code comprising:
- computer program code adapted to receive computer graphics data defining a scene including at least one light source and at least one object model;
- computer program code adapted to generate a geometric representation of an effective illumination region for a light source in the scene;
- computer program code adapted to determine an intersection between geometric representation and said at least one object model in the scene; and
- computer program code adapted to remove the light source from the scene in response to a determination that the geometric representation of the light source does not intersect with the object model in the scene.

25. A computer-readable storage medium, that stores code for execution in a processor of a computer device, the code comprising:
- computer program code adapted to receive computer graphics data defining a scene to be rendered into at least one computer graphics image including at least one light source and a plurality of object models;
- computer program code adapted to generate a geometric representation of an effective illumination region of the light source; and
- computer program code adapted to remove the light source from the computer graphics images specified by the computer graphics data in response to a determination that the geometric representation does not intersect with at least one of the plurality of object models potentially visible in the computer graphics images specified by the computer graphics data.

* * * * *